(12) United States Patent
Schmidt et al.

(10) Patent No.: US 9,265,076 B2
(45) Date of Patent: Feb. 16, 2016

(54) NETWORK COVERAGE HOLE DETECTION

(71) Applicants: Andreas Schmidt, Braunschweig (DE); Joey Chou, Scottsdale, AZ (US); Ana Lucia Pinheiro, Breinigsville, PA (US)

(72) Inventors: Andreas Schmidt, Braunschweig (DE); Joey Chou, Scottsdale, AZ (US); Ana Lucia Pinheiro, Breinigsville, PA (US)

(73) Assignee: INTEL IP CORPORATION, Santa Clara, CA (US)

( * ) Notice: Subject to any disclaimer, the term of this patent is extended or adjusted under 35 U.S.C. 154(b) by 111 days.

(21) Appl. No.: 14/255,216

(22) Filed: Apr. 17, 2014

(65) Prior Publication Data
US 2015/0031308 A1    Jan. 29, 2015

Related U.S. Application Data

(60) Provisional application No. 61/859,121, filed on Jul. 26, 2013.

(51) Int. Cl.
H04W 84/12 (2009.01)
H04W 76/02 (2009.01)
H04W 52/02 (2009.01)
(Continued)

(52) U.S. Cl.
CPC ......... *H04W 76/02* (2013.01); *H04J 11/0023* (2013.01); *H04L 5/14* (2013.01); *H04L 69/16* (2013.01); *H04W 4/005* (2013.01); *H04W 16/28* (2013.01); *H04W 24/02* (2013.01); *H04W 24/08* (2013.01); *H04W 36/0066* (2013.01); *H04W 36/0083* (2013.01); *H04W 52/0209* (2013.01); *H04W 72/0413* (2013.01); *H04W 72/082* (2013.01); *H04W 74/0833* (2013.01); *H04W 76/021* (2013.01); *H04W 76/023* (2013.01); *H04W 76/046* (2013.01);
(Continued)

(58) Field of Classification Search
CPC .............................. H04W 24/02; H04W 24/10
See application file for complete search history.

(56) References Cited

U.S. PATENT DOCUMENTS

2012/0106386 A1*  5/2012  Johansson ............. H04W 24/10
                                                                370/252
2012/0108241 A1   5/2012  Wu
(Continued)

FOREIGN PATENT DOCUMENTS

WO    WO 2012/050323 A2    4/2012
WO    WO 2012/148205 A2    11/2012

OTHER PUBLICATIONS

PCT Application PCT/US2014/047421; filed Jul. 21, 2014; Intel IP Corporation et al.; International Search Report mailed /Nov. 3, 2014.
(Continued)

*Primary Examiner* — David Bilodeau
(74) *Attorney, Agent, or Firm* — Thorpe North & Western LLP

(57) ABSTRACT

A technology for a user equipment (UE) that is operable to connect to a third generation partnership project (3GPP) long term evolution (LTE) cell in a cellular network. Logged minimization of drive test (MDT) measurements can be recorded at the UE at a selected rate when the UE is in a radio resource control (RRC) idle mode in a first LTE cell in a cellular network. A change in a UE state of the RRC idle mode can be identified. The Logged MDT measurements can stop being recorded at the UE when the UE state changes from a camped normally UE state to another UE state of the RRC idle mode. The Logged MDT measurements can resume being recorded when the UE state changes to the camped normally UE state of the RRC idle mode.

24 Claims, 25 Drawing Sheets

(51) Int. Cl.
| | |
|---|---|
| *H04W 4/00* | (2009.01) |
| *H04L 5/14* | (2006.01) |
| *H04W 76/04* | (2009.01) |
| *H04W 36/00* | (2009.01) |
| *H04W 24/08* | (2009.01) |
| *H04W 72/08* | (2009.01) |
| *H04W 72/04* | (2009.01) |
| *H04W 74/08* | (2009.01) |
| *H04L 29/06* | (2006.01) |
| *H04W 24/02* | (2009.01) |
| *H04W 16/28* | (2009.01) |
| *H04J 11/00* | (2006.01) |
| *H04W 88/06* | (2009.01) |
| *H04W 88/08* | (2009.01) |

(52) U.S. Cl.
CPC .............. *H04W 84/12* (2013.01); *H04W 88/06* (2013.01); *H04W 88/08* (2013.01)

(56) References Cited

U.S. PATENT DOCUMENTS

| | | | |
|---|---|---|---|
| 2013/0012188 A1 | 1/2013 | Gao et al. | |
| 2013/0058220 A1* | 3/2013 | Yi ..................... | H04W 72/1284 370/241 |
| 2013/0196604 A1* | 8/2013 | Jung ..................... | H04W 24/02 455/67.11 |
| 2014/0036656 A1* | 2/2014 | Chou .................. | H04W 76/048 370/216 |
| 2014/0051428 A1* | 2/2014 | Jung ..................... | H04W 24/10 455/422.1 |

OTHER PUBLICATIONS

3GPP TR 32.836 v0.5.0; $3^{rd}$ Generation Partnership Project; Technical Specification Goup Services and System Aspects; Telecommunication management; Study on NM Centralized Coverage and Capacity Optimization (CCO0 SON Function; May 2013; 16 pages; Release 12.

3GPP TS 32.422 v11.6.0; $3^{rd}$ Generation Partnership Project; Technical Specification Group Services and System Aspects; Telecommunication management; Subscriber and equipment trace; Trace control and configuration management; Dec. 2012; 131 pages; Release 11.

3GPP TS 36.300 v11.4.0; $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; Dec. 2012; 208 pages; Release 11.

3GPP TS 36.331 v11.2.0; $3^{rd}$ Generation Partnership Project; Technical Specification Group Radio Access Network; Evolved Universal Terrestrial Tadio Access (E-UTRA); Radio Resource Control (RRC); Protocol specification; Dec. 2012; 340 pages; Release 11.

3GPP TS 36.413 v11.6.0; $3^{rd}$ Generation Partnership Project; Technical Specifiaction Group Radio Access Network; Evolved Universal Terrestrial Radio Access Network (E-UTRAN); S1 Application Protocol (S1AP); Dec. 2013; 274 pages; Release 11.

3GPP TS 37.320 v11.2.0; $3^{rd}$ Generation Partnership Project; Technical Specification Group Radio Access Network; Universal Terrestrial Radio Access (UTRA) and Evolved Universal Terrestrial Radio Access (E-UTRA); Radio Measurement collection for Minimization of Drive tests (MDT); Overall description; Stage 2; Dec. 2012; 22 pages; Release 11.

* cited by examiner

| The IE defines the MDT configuration parameters. IE/Group Name | Presence | Range | IE type and reference | Semantics description |
|---|---|---|---|---|
| MDT Activation | M | | ENUMERATED(Immediate MDT only, Logged MDT only, Immediate MDT and Trace, ...) | |
| CHOICE *Area Scope of MDT* | M | | | |
| >*Cell based* | | | | |
| >>Cell ID List for MDT | | 1 to <maxnoof CellIDfor MDT> | | |
| >>>E-CGI | M | | 9.2.1.38 | |
| >*TA based* | | | | |
| >>TA List for MDT | | 1 to <maxnoof TAforMD T> | | |
| >>>TAC | M | | 9.2.3.7 | |
| >*PLMN Wide* | | | NULL | |
| CHOICE *MDT Mode* | M | | | |
| >*Immediate MDT* | | | | |
| >>Measurements to Activate | M | | BITSTRING (SIZE(8)) | Each position in the bitmap indicates a MDT measurement, as defined in TS 37.320 [31]. First Bit = M1, Second Bit = M2. Other bits are reserved for future use and are ignored if received. Value "1" indicates "activate" and value "0" indicates "do not activate". |

FIG. 5

| The IE defines the MDT configuration parameters. IE/Group Name | Presence | Range | IE type and reference | Semantics description |
|---|---|---|---|---|
| >>Reporting Trigger MDT | M | | ENUMERATED (periodic, A2event-triggered, ...) | |
| >>Threshold Event A2 | C-ifM1A2trigger | | | Included in case of event-triggered reporting for measurement M1 |
| >>>CHOICE Threshold | M | | | |
| >>>>RSRP | | | | |
| >>>>>Threshold RSRP | M | | INTEGER (0..97) | This IE is defined in TS 36.331 [16]. |
| >>>>RSRQ | | | | |
| >>>>>Threshold RSRQ | M | | INTEGER (0..34) | This IE is defined in TS 36.331 [16]. |
| >>Periodic reporting MDT | C-ifperiodic MDT | | | Included in case of periodic reporting. |
| >>>Report interval | M | | ENUMERATED (ms120, ms240, ms480, ms640, ms1024, ms2048, ms5120, ms10240, , min1, min6, min12, min30, min60) | This IE is defined in TS 36.331 [16]. |
| >>>Report amount | M | | ENUMERATED (1, 2, 4, 8, 16, 32, 64, infinity) | Number of reports. |
| >Logged MDT | | | | |
| >>Logging interval | M | | ENUMERATED (1.28, 2.56, 5.12,10.24,20.48, 30.72, 40.96 and 61.44) | This IE is defined in TS 36.331 [16]. Unit: [second] |
| CCO-SON | O | | Boolean (true, false) | Used to turn "CCO-SON" on and off. Value "1" indicates "activate" and value "0" indicates "do not activate". |
| >>Logging duration | M | | ENUMERATED (10, 20, 40, 60, 90 and 120) | This IE is defined in TS 36.331 [16]. Unit: [minute] |

FIG. 6

| The IE defines the MDT configuration parameters. IE/Group Name | Presence | Range | IE type and reference | Semantics description |
|---|---|---|---|---|
| MDT Activation | M | | ENUMERATED(Immediate MDT only, Logged MDT only, Immediate MDT and Trace, ...) | |
| CHOICE Area Scope of MDT | M | | | |
| >Cell based | | | | |
| >>Cell ID List for MDT | | 1 to <maxnoofCellIDfor MDT> | | |
| >>>E-CGI | M | | 9.2.1.38 | |
| >TA based | | | | |
| >>TA List for MDT | | 1 to <maxnoofTAforM DT> | | |
| >>>TAC | M | | 9.2.3.7 | |
| >PLMN Wide | | | NULL | |
| CHOICE MDT Mode | M | | | |
| >Immediate MDT | | | | |
| >>Measurements to Activate | M | | BITSTRING (SIZE(8)) | Each position in the bitmap indicates a MDT measurement, as defined in TS 37.320 [31]. First Bit = M1, Second Bit= M2. Other bits are reserved for future use and are ignored if received. Value "1" indicates "activate" and value "0" indicates "do not activate". |
| >>Reporting Trigger MDT | M | | ENUMERATED (periodic, A2event-triggered, ...) | |
| >>Threshold Event A2 | C-ifM1A2trigger | | | Included in case of event-triggered reporting for measurement M1 |
| >>>CHOICE Threshold | M | | | |
| >>>>RSRP | | | | |
| >>>>>Threshold RSRP | M | | INTEGER (0..97) | This IE is defined in TS 36.331 [16]. |
| >>>>RSRQ | | | | |
| >>>>>Threshold RSRQ | M | | INTEGER (0..34) | This IE is defined in TS 36.331 [16]. |
| >>Periodic reporting MDT | C-ifperiodicMDT | | | Included in case of periodic reporting. |
| >>>Report Interval | M | | ENUMERATED (ms120, ms240, ms480, ms640, ms1024, ms2048, ms5120, ms10240, , min1, min6, min12, min30, min60) | This IE is defined in TS 36.331 [16]. |
| >>>Report amount | M | | ENUMERATED (1, 2, 4, 8, 16, 32, 64, infinity) | Number of reports. |

FIG. 7

| The IE defines the MDT configuration parameters IE/Group Name | Presence | Range | IE type and reference | Semantics description |
|---|---|---|---|---|
| >Logged MDT | | | | |
| >>Logging interval | M | | ENUMERATED (1.28, 2.58, 5.12, 10.24, 20.48, 30.72, 40.96 and 61.44) | This IE is defined in TS 36.331 [16] Unit: [second] |
| >>Logging duration | M | | ENUMERATED (10, 20, 40, 60, 90 and 120) | This IE is defined in TS 36.331 [16] Unit: [minute] |
| CCO-SON | O | | | Container for CCO SON Measurement Commands |
| >from LTE to HSPA | O | | Boolean (true, false) | Used to turn collection of location stamps on and off when an Inter-RAT cell reselection event from LTE to UMTS occurs. Value "1" indicates "activate" and value "0" indicates "do not activate". |
| >from HSPA to LTE | O | | Boolean (true, false) | Used to turn collection of location stamps on and off when an Inter-RAT cell reselection event from UMTS to LTE occurs. Value "1" indicates "activate" and value "0" indicates "do not activate". |
| >from LTE to Coverage Hole | O | | Boolean (true, false) | Used to turn collection of location stamps on and off when an LTE Coverage Hole is detected. Value "1" indicates "activate" and value "0" indicates "do not activate". |
| >from Coverage Hole to LTE | O | | Boolean (true, false) | Used to turn collection of location stamps on and off when the UE moves from an LTE Coverage Hole back to an LTE cell. Value "1" indicates "activate" and value "0" indicates "do not activate". |
| >Maximum Number of Cell Reselection Events | O | | INTEGER | Used to specify a maximum number of Cell Reselection Events (CRE) to be collected by the UE. |
| >Inter PLMN Indicator | O | | Boolean (true, false) | Used to collect information about Inter-PLMN cell reselections. Value "1" indicates "Different PLMN" and value "0" indicates "Same PLMN". |

FIG. 8

```
-- ASN1START

LoggedMeasurementConfiguration-r10 ::= SEQUENCE {
    criticalExtensions              CHOICE {
        c1                          CHOICE {
            loggedMeasurementConfiguration-r10
    LoggedMeasurementConfiguration-r10-IEs,
            spare3 NULL, spare2 NULL, spare1 NULL
        },
        criticalExtensionsFuture    SEQUENCE {}
    }
}

LoggedMeasurementConfiguration-r10-IEs ::= SEQUENCE {
    traceReference-r10              TraceReference-r10,
    traceRecordingSessionRef-r10    OCTET STRING (SIZE (2)),
    tce-Id-r10                      OCTET STRING (SIZE (1)),
    absoluteTimeInfo-r10            AbsoluteTimeInfo-r10,
    areaConfiguration-r10           AreaConfiguration-r10       OPTIONAL, -- Need
OR
    loggingDuration-r10             LoggingDuration-r10,
    loggingInterval-r10             LoggingInterval-r10, -- CCO SON configuration parameters
    CCO-SON ::=                     SEQUENCE {
        FromLTEtoHSPA               BOOLEAN
        FromHSPAtoLTE               BOOLEAN
        FromLTEtoCoverageHole       BOOLEAN
        FromCoverageHoletoLTE       BOOLEAN
        MaxNumberOfCRE              INTEGER
        InterPLMNIndicator          BOOLEAN
    }

}

-- ASN1STOP
```

FIG. 10

```
-- ASN1START

Inter-RATCellReselectionDetection ::= SEQUENCE {
    traceReference-r10          TraceReference-r10,
    traceRecordingSessionRef-r10 OCTET STRING (SIZE (2)),
    tce-Id-r10                  OCTET STRING (SIZE (1)),
    absoluteTimeInfo-r10        AbsoluteTimeInfo-r10,
    areaConfiguration-r10       AreaConfiguration-r10    OPTIONAL, -- Need
OR
    loggingDuration-r10         LoggingDuration-r10,
    loggingInterval-r10         LoggingInterval-r10, -- CCO SON configuration parameters
    CCO-SON ::=                 SEQUENCE {
        FromLTEtoHSPA                   BOOLEAN
        FromHSPAtoLTE                   BOOLEAN
        FromLTEtoCoverageHole           BOOLEAN
        FromCoverageHoletoLTE           BOOLEAN
        MaxNumberOfCRE                  INTEGER
        InterPLMNIndicator              BOOLEAN
    }

}

-- ASN1STOP
```

FIG. 12

```
-- ASN1START

UEInformationResponse-r9 ::=        SEQUENCE {
    rrc-TransactionIdentifier       RRC-TransactionIdentifier,
    criticalExtensions              CHOICE {
        c1                              CHOICE {
            ueInformationResponse-r9        UEInformationResponse-r9-IEs,
            spare3 NULL, spare2 NULL, spare1 NULL
        },
        criticalExtensionsFuture        SEQUENCE {}
    }
}

UEInformationResponse-r9-IEs ::=    SEQUENCE {
    rach-Report-r9                      SEQUENCE {
        numberOfPreamblesSent-r9            INTEGER (1..200),
        contentionDetected-r9               BOOLEAN
    }                                                       ,
    rlf-Report-r9                       RLF-Report-r9       ,
    nonCriticalExtension                UEInformationResponse-v930-IEs
}

UEInformationResponse-v930-IEs ::= SEQUENCE {
    lateNonCriticalExtension        OCTET STRING                        ,
    nonCriticalExtension            UEInformationResponse-v1020-IEs
}

UEInformationResponse-v1020-IEs ::= SEQUENCE {
    logMeasReport-r10                   LogMeasReport-r10               ,
    nonCriticalExtension                SEQUENCE {}
}

RLF-Report-r9 ::=                   SEQUENCE {
    measResultLastServCell-r9           SEQUENCE {
        rsrpResult-r9                       RSRP-Range,
        rsrqResult-r9                       RSRQ-Range
    },
    measResultNeighCells-r9             SEQUENCE {
        measResultListEUTRA-r9              MeasResultList2EUTRA-r9     ,
        measResultListUTRA-r9               MeasResultList2UTRA-r9      ,
        measResultListGERAN-r9              MeasResultListGERAN         ,
        measResultsCDMA2000-r9              MeasResultList2CDMA2000-r9
    }   ,
    ...,
```

FIG. 14A

```
[[ locationInfo-r10              LocationInfo-r10            ,
      failedPCellId-r10             CHOICE {
         cellGlobalId-r10              CellGlobalIdEUTRA,
         pci-arfcn-r10                 SEQUENCE {
            physCellId-r10                PhysCellId,
            carrierFreq-r10               ARFCN-ValueEUTRA
         }
      }                                                       ,
      reestablishmentCellId-r10    CellGlobalIdEUTRA          ,
      timeConnFailure-r10          INTEGER (0..1023)          ,
      connectionFailureType-r10    ENUMERATED {rlf, hof}      ,
      previousPCellId-r10          CellGlobalIdEUTRA
   ]]
}

MeasResultList2EUTRA-r9 ::=          SEQUENCE (SIZE (1..maxFreq)) OF
MeasResult2EUTRA-r9

MeasResult2EUTRA-r9 ::=              SEQUENCE {
   carrierFreq-r9                       ARFCN-ValueEUTRA,
   measResultList-r9                    MeasResultListEUTRA
}

MeasResultList2UTRA-r9 ::=           SEQUENCE (SIZE (1..maxFreq)) OF
MeasResult2UTRA-r9

MeasResult2UTRA-r9 ::=               SEQUENCE {
   carrierFreq-r9                       ARFCN-ValueUTRA,
   measResultList-r9                    MeasResultListUTRA
}

MeasResultList2CDMA2000-r9 ::=       SEQUENCE (SIZE (1..maxFreq)) OF
MeasResult2CDMA2000-r9

MeasResult2CDMA2000-r9 ::=           SEQUENCE {
   carrierFreq-r9                       CarrierFreqCDMA2000,
   measResultList-r9                    MeasResultsCDMA2000
}
```

FIG. 14B

```
LogMeasReport-r10 ::=              SEQUENCE {
    absoluteTimeStamp-r10          AbsoluteTimeInfo-r10,
    traceReference-r10             TraceReference-r10,
    traceRecordingSessionRef-r10   OCTET STRING (SIZE (2)),
    tce-Id-r10                     OCTET STRING (SIZE (1)),
    logMeasInfoList-r10            LogMeasInfoList-r10,
    logMeasAvailable-r10           ENUMERATED {true}                ,
    ...
}

LogMeasInfoList-r10 ::=    SEQUENCE (SIZE (1..maxLogMeasReport-r10)) OF
LogMeasInfo-r10

LogMeasInfo-r10 ::=        SEQUENCE {
    locationInfo-r10               LocationInfo-r10        ,
    relativeTimeStamp-r10          INTEGER (0..7200),
    servCellIdentity-r10           CellGlobalIdEUTRA,
    TypeOfCRE                  ENUMERATED {fromLTEtoUMTS, fromUMTStoLTE,
fromLTEtoCoverageHole, fromCoverageHoletoLTE}                        ,
    PLMN-Change                BOOLEAN                               ,
    measResultServCell-r10         SEQUENCE {
        rsrpResult-r10                 RSRP-Range,
        rsrqResult-r10                 RSRQ-Range
    },
} measResultNeighCells-r10       SEQUENCE {
        measResultListEUTRA-r10           MeasResultList2EUTRA-r9    ,
        measResultListUTRA-r10         MeasResultList2UTRA-r9     ,
        measResultListGERAN-r10           MeasResultList2GERAN-r10   ,
        measResultListCDMA2000-r10        MeasResultList2CDMA2000-r9
    }  ,
    ...
}

MeasResultList2GERAN-r10 ::=       SEQUENCE (SIZE (1..maxCellListGERAN)) OF
MeasResultListGERAN

-- ASN1STOP
```

FIG. 14C

```
-- ASN1START

UEInformationResponse-r9 ::=        SEQUENCE {
   rrc-TransactionIdentifier        RRC-TransactionIdentifier,
   criticalExtensions               CHOICE {
       c1                           CHOICE {
           ueInformationResponse-r9         UEInformationResponse-r9-IEs,
           spare3 NULL, spare2 NULL, spare1 NULL
       },
       criticalExtensionsFuture         SEQUENCE {}
   }
}

UEInformationResponse-r9-IEs ::=    SEQUENCE {
   rach-Report-r9                   SEQUENCE {
       numberOfPreamblesSent-r9         INTEGER (1..200),
       contentionDetected-r9            BOOLEAN
   }                                                        ,
   rlf-Report-r9                    RLF-Report-r9           ,
   nonCriticalExtension             UEInformationResponse-v930-IEs
}

UEInformationResponse-v930-IEs ::= SEQUENCE {
   lateNonCriticalExtension         OCTET STRING            ,
   nonCriticalExtension             UEInformationResponse-v1020-IEs
}

UEInformationResponse-v1020-IEs ::= SEQUENCE {
   logMeasReport-r10                LogMeasReport-r10       ,
   nonCriticalExtension             SEQUENCE {}
}

RLF-Report-r9 ::=                   SEQUENCE {
   measResultLastServCell-r9        SEQUENCE {
       rsrpResult-r9                    RSRP-Range,
       rsrqResult-r9                    RSRQ-Range
   },
   measResultNeighCells-r9          SEQUENCE {
       measResultListEUTRA-r9           MeasResultList2EUTRA-r9     ,
       measResultListUTRA-r9            MeasResultList2UTRA-r9      ,
       measResultListGERAN-r9           MeasResultListGERAN         ,
       measResultsCDMA2000-r9           MeasResultList2CDMA2000-r9
   }  ,
   ...,
```

FIG. 15A

```
[[ locationInfo-r10              LocationInfo-r10            ,
      failedPCellId-r10                CHOICE {
         cellGlobalId-r10                  CellGlobalIdEUTRA,
         pci-arfcn-r10                     SEQUENCE {
            physCellId-r10                    PhysCellId,
            carrierFreq-r10                   ARFCN-ValueEUTRA
         }
      }                                                       ,
      reestablishmentCellId-r10   CellGlobalIdEUTRA           ,
      timeConnFailure-r10         INTEGER (0..1023)           ,
      connectionFailureType-r10   ENUMERATED {rlf, hof}       ,
      previousPCellId-r10         CellGlobalIdEUTRA
   ]]
}

MeasResultList2EUTRA-r9 ::=          SEQUENCE (SIZE (1..maxFreq)) OF
MeasResult2EUTRA-r9

MeasResult2EUTRA-r9 ::=              SEQUENCE {
   carrierFreq-r9                       ARFCN-ValueEUTRA,
   measResultList-r9                    MeasResultListEUTRA
}

MeasResultList2UTRA-r9 ::=           SEQUENCE (SIZE (1..maxFreq)) OF
MeasResult2UTRA-r9

MeasResult2UTRA-r9 ::=               SEQUENCE {
   carrierFreq-r9                       ARFCN-ValueUTRA,
   measResultList-r9                    MeasResultListUTRA
}

MeasResultList2CDMA2000-r9 ::=       SEQUENCE (SIZE (1..maxFreq)) OF
MeasResult2CDMA2000-r9

MeasResult2CDMA2000-r9 ::=           SEQUENCE {
   carrierFreq-r9                       CarrierFreqCDMA2000,
   measResultList-r9                    MeasResultsCDMA2000
}

CCOSONReport ::=     SEQUENCE {
   absoluteTimeStamp-r10    AbsoluteTimeInfo-r10,
   traceReference-r10       TraceReference-r10,
   traceRecordingSessionRef-r10   OCTET STRING (SIZE (2)),
   tce-Id-r10               OCTET STRING (SIZE (1)),
   CCOSONResultsList ::=    SEQUENCE (SIZE (1.. MaxNumberOfCRE)) OF
CCOSONResults
   logMeasAvailable-r10     ENUMERATED {true}                ,
}
```

FIG. 15B

```
CCOSONResults ::=        SEQUENCE {
    locationInfo-r10          LocationInfo-r10
    relativeTimeStamp-r10     INTEGER (0..7200)
    servCellIdentity-r10      CellGlobalIdEUTRA
    TypeOfCRE                 ENUMERATED {fromLTEtoUMTS, fromUMTStoLTE,
fromLTEtoCoverageHole, fromCoverageHoletoLTE}                           ,
    PLMN-Change               BOOLEAN                                   ,
}

LogMeasReport-r10 ::=              SEQUENCE {
    absoluteTimeStamp-r10          AbsoluteTimeInfo-r10,
    traceReference-r10             TraceReference-r10,
    traceRecordingSessionRef-r10   OCTET STRING (SIZE (2)),
    tce-Id-r10                     OCTET STRING (SIZE (1)),
    logMeasInfoList-r10            LogMeasInfoList-r10,
    logMeasAvailable-r10           ENUMERATED {true}                    ,
    ...
}

LogMeasInfoList-r10 ::=     SEQUENCE (SIZE (1..maxLogMeasReport-r10)) OF
LogMeasInfo-r10

LogMeasInfo-r10 ::=      SEQUENCE {
    locationInfo-r10          LocationInfo-r10         ,
    relativeTimeStamp-r10     INTEGER (0..7200),
    servCellIdentity-r10      CellGlobalIdEUTRA,
    measResultServCell-r10    SEQUENCE {
        rsrpResult-r10            RSRP-Range,
        rsrqResult-r10            RSRQ-Range
    },
} measResultNeighCells-r10        SEQUENCE {
        measResultListEUTRA-r10         MeasResultList2EUTRA-r9      ,
        measResultListUTRA-r10          MeasResultList2UTRA-r9       ,
        measResultListGERAN-r10         MeasResultList2GERAN-r10     ,
        measResultListCDMA2000-r10      MeasResultList2CDMA2000-r9
    }   ,
    ...
}

MeasResultList2GERAN-r10 ::=       SEQUENCE (SIZE (1..maxCellListGERAN)) OF
MeasResultListGERAN

-- ASN1STOP
```

FIG. 15C

| The IE defines the MDT reporting parameters. | Presence | Range | IE type | Semantics description |
|---|---|---|---|---|
| CCOSON | O | | | Container for CCO SON Measurement Results |
| >Record Number | O | | INTEGER | Used to provide a unique record identifier for each set of CCO SON results. |
| >Location Information | | | | Container for the two location information options. |
| >>Set of GNSS Data | O | | to be defined... | Container for GNSS information. |
| >>Set of RF Fingerprints | O | | to be defined... | Container for RF Fingerprint information. |
| >Serving Cell-ID | O | | BITSTRING (SIZE(28)) | Cell-ID of the cell the UE was camping on prior to detection of a cell reselection event. |
| >Type of CRE | O | | ENUMERATED (fromLTEtoUMTS, fromUMTStoLTE, fromLTEtoCoverage Hole, fromCoverageHoleto LTE) | Type of this Cell Reselection Event (CRE). |
| >PLMN Change | O | | Boolean (true, false) | Indication of a PLMN change during this CRE. |

FIG. 16

NETWORK COVERAGE HOLE DETECTION

RELATED APPLICATIONS

This application claims the benefit of and hereby incorporates by reference U.S. Provisional Patent Application Ser. No. 61/859,121, filed Jul. 26, 2013.

BACKGROUND

When deploying a Radio Access Technology (RAT) in a communications network, coverage planning can be a complex task for operators because of environmental conditions, interference from other networks or devices, and so forth. Avoiding coverage holes in cellular networks when planning cell locations can be difficult. Coverage detection and optimization processes can be used to detect coverage holes in cellular networks.

Traditionally, coverage detection is performed through drive tests where a motor vehicle equipped with mobile radio equipment drives around in cellular networks measuring different network coverage metrics. The coverage measurements are then processed by radio experts for network coverage optimization. Network coverage can be optimized by tuning network parameters such as a transmission power of a node or antenna orientations and tilts. The use of drive tests can involve large Operational Expenditure (OPEX), delays in detecting the problems, and may not offer a complete and reliable picture of the network coverage. Additionally, the drive tests are limited to areas accessible by motor vehicles, such as roads. Drive tests are not helpful in detecting coverage problems inside buildings, off-road environments, or other areas not accessible to motor vehicles.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 shows a table of parameters of an information element (IE) for the CCO SON in a MDT configuration in accordance with an example;

FIG. 6 shows a table of parameters of an IE for the CCO SON in a MDT configuration in accordance with an example;

FIG. 7 shows a table of parameters of an IE for the CCO SON in a MDT configuration in accordance with an example;

FIG. 8 shows a table of parameters of an IE for the CCO SON in a MDT configuration in accordance with an example;

FIG. 10 shows programming code used to modify a logged measurement configuration RRC message in accordance with an example;

FIG. 12 shows programming code used to modify an inter radio access technology (RAT) cell reselection detection message in accordance with an example;

FIG. 14A shows an exemplary embodiment of programming code used to modify a UE information response message in accordance with an example;

FIG. 14B shows an exemplary embodiment of programming code used to modify a UE information response message in accordance with an example;

FIG. 14C shows an exemplary embodiment of programming code used to modify a UE information response message in accordance with an example;

FIG. 15A shows another exemplary embodiment of programming code used to modify a UE information response message in accordance with an example;

FIG. 15B shows another exemplary embodiment of programming code used to modify a UE information response message in accordance with an example;

FIG. 15C shows another exemplary embodiment of programming code used to modify a UE information response message in accordance with an example;

FIG. 16 shows a table of trace-based MDT reporting parameters to inform a trace collection entity (TCE) about MDT measurements that were collected by a UE in a CCO SON in accordance with an example;

Figure 1:
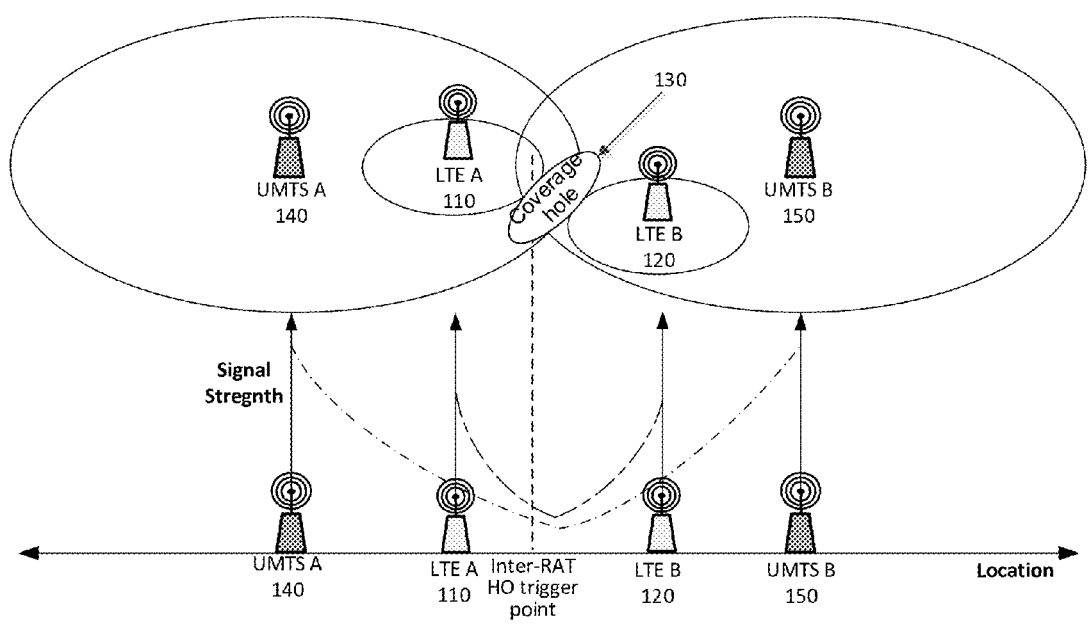
FIG. 1 depicts a coverage hole between a third generation partnership project (3GPP) long term evolution (LTE) node and another 3GPP LTE node in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Cellular network providers desire to provide optimal cellular coverage for users of the cellular network services. Previously, cellular network providers deployed universal mobile telecommunications system (UMTS) nodes and/or high speed packet access (HSPA) nodes to provide coverage to the users of the cellular network. More recently, third generation partnership project (3GPP) long term evolution (LTE) coverage has been deployed by cellular network providers to increase the performance of cellular networks, such as increasing data communication capacity and data transfer speeds. In some areas within the cellular networks of the service providers, 3GPP LTE coverage is sporadic or intermittent, e.g. there are holes in the 3GPP LTE network coverage. For example, a cellular network of a service provider can offer continuous or comprehensive network coverage at an underlying UMTS/HSPA layer of a network while offering limited or sporadic coverage at a 3GPP LTE layer of the network.

In cellular communications, a coverage hole is an area in which the signal strength of a cellular network experienced by a user equipment (UE) is insufficient to maintain connectivity and there is no coverage from an alternative 3GPP LTE cell. For example, a coverage hole can an area where a signal to noise ratio (SNR) or a signal to interference plus noise ratio (SINR) of a serving and neighboring cells, such as 3GPP LTE cells, is below a threshold level to maintain basic service. Coverage holes can be caused by physical obstructions (such as new buildings and hills), unsuitable antenna parameters, or inadequate radio frequency (RF) planning. A multiple band (multi-band) and/or multiple radio access technology (multi-RAT) UE can switch to another band or RAT when a coverage hole is detected.

Coverage holes can exist in a single cell or node of a cellular network or in the vicinity of a border between adjacent cells, i.e. a cell edge. At a cell edge, a UE or a network can perform a handover process to move the UE from one cell to another cell in the cellular network. A handover of the UE from one cell to another may fail because of the coverage holes between the cells. Coverage holes can also occur between different types of cells or nodes in a cellular network. For example, when a UE is moving within the cellular network, the UE may initially be in communication with a 3GPP LTE node and then move outside of the 3GPP LTE node coverage. When there is not 3GPP LTE coverage for a location where the UE is located, the UE may search for another node within the cellular network, such as a UMTS node, and switch to the other node. The area where there 3GPP LTE node does not provide 3GPP LTE coverage to the UE can be a coverage hole for the 3GPP LTE network within the cellular network.

FIG. 1 depicts a coverage hole 130 between two 3GPP LTE nodes, referred to as a 3GPP LTE A node 110 and a 3GPP LTE B node 120. FIG. 1 also shows coverage areas for two UMTS nodes, UMTS A node 140 and UMTS B node 150. The region between the coverage areas of the 3GPP LTE A node 110 and the 3GPP LTE B node 120 is at the cell edge of 3GPP LTE A node 110 and 3GPP LTE B node 120 and does not provide a region where a UE can have 3GPP LTE network coverage, e.g. a coverage hole 130. When a UE leaves the coverage area of the 3GPP LTE A node 110 and enters the coverage hole 130, and before entering the coverage area of the 3GPP LTE B node 120, the UE can switch to a UMTS node, e.g. UMTS A node 140 or UMTS B node 150.

In one embodiment, to determine coverage holes in a cellular network, the cellular network can use a minimization of drive test (MDT) measurement. In one embodiment, the MDT measurement can be used for a UE using an intra-RAT mode, i.e. when a UE switches between two nodes that are the same type of node, with the same RAT. For example, a UE that switches from one UMTS node to another UMTS node is using an intra-RAT mode. In another embodiment, the MDT measurement can be used for a UE using an inter-RAT mode, i.e. when a UE switches between two nodes that are different types of RATs. For example, a UE that switches from a 3GPP LTE node to a UMTS node is using an inter-RAT mode.

In one embodiment, a UE can have an MDT configuration that is RAT-specific. The MDT configuration can be used to configure the UE to take MDT measurements. The MDT measurements can include radio measurements and location information of the UE. One advantage of the cellular network using MDT measurements to determine cellular network coverage and coverage holes can be to assess network performance while reducing an Operational Expenditure (OPEX) associated with using traditional drive tests to determine cellular network coverage and coverage holes. In one embodiment, a network operator can request the UEs perform and report specific radio measurement and/or Quality of Service (QoS) measurements associated with the location of the UE.

In one embodiment, to increase network performance and flexibility and reduce capital expenditures and operational expenditures, a self-organizing network (SON) can be used in a 3GPP network. A SON of a 3GPP network can have self-organizing capabilities for automating the configuration and optimization of the wireless network by introducing functionalities of self-configuration, self-optimization, and self-healing. Self-configuration provides the capabilities for newly deployed eNode Bs in the cellular network to finish the configuration with automatic installation procedures for obtaining the basic configuration information to operate the system. Self-configuration procedures can include automatic configuration of physical cell identity, neighbor-list configuration, and coverage and capacity parameters.

A coverage and capacity optimization (CCO) function can be used by mobile network operators (MNOs) to reduce OPEX by automating the maintenance and optimization of a coverage and capacity of the network. In one embodiment, a CCO function can be used to monitor network coverage and capacity performance, automatically detect problems in the network, and take selected actions or notify the operator when an operator action may be needed to fix the problem. In one embodiment, a UE can take MDT measurements and an eNode B can use the MDT measurements to monitor network performance and coordinate a cellular network optimization procedure.

In one embodiment the MDT measurements can be Immediate MDT measurements. An Immediate MDT measurement can be taken when a UE is in a radio resource control (RRC) connected state. When a UE takes Immediate MDT measurements, the MDT measurements can be reported at approximately the time that the MDT measurements are taken. In one embodiment, the Immediate MDT measurements can be configured using RRC signaling procedures for radio resource management (RRM) measurements. The Immediate MDT measurements can be reported using RRM measurement reporting procedures.

In another embodiment the MDT measurements can be Logged MDT measurements. A Logged MDT measurement can be taken when a UE is in an RRC idle state. The UE can receive an MDT configuration using RRC signaling while the UE is in an RRC connected state. The MDT configuration can remain valid during an RRC idle state and/or when the UE switches between RRC idle states and RRC connected states. In one embodiment, the MDT configuration for the Logged MDT can remain valid while a UE resides in another RAT.

In one embodiment, Logged MDT measurements can be taken by collecting MDT measurement data, storing the MDT measurement data at the UE, and creating a log file of the MDT measurement data at the UE. The log file can be communicated from the UE to the network, such as to a node or server in an evolved universal terrestrial radio access network (E-UTRAN) network. In one embodiment, the log file can be communicated to the node or server when the UE returns to an RRC connected state and the node or server requests the log file. For example, when the UE returns to an RRC connected state the node or server can use RRC message pairs, a UE information request and a UE information response, to request the log file.

Traditionally, to determine coverage holes, a UE is configured to continuously report data to the network. The network can then communicate the reported data to a trace collection entity (TCE), such as an MDT server, and the TCE can filter and analyze the data at a later point in time to determine coverage holes.

One advantage of using MDT measurements, such as Logged MDT measurements, can be to decrease the amount of data communicated from the UE to the network. A decrease in the amount of data can decrease the processing time and processing power needed to determine coverage holes. Another advantage of using MDT measurements, such as Logged MDT measurements, to determine coverage holes can be to minimize the number and/or size of measurements taken to determine coverage holes. When a minimal number and/or size of measurements is taken, the decreased number and/or size of the measurements can increase the battery life of a UE, reduce data traffic communicated in a network, and reduce the memory storage requirements of the UE to store the MDT measurement, such as the Logged-MDT measurements.

Figure 2A:
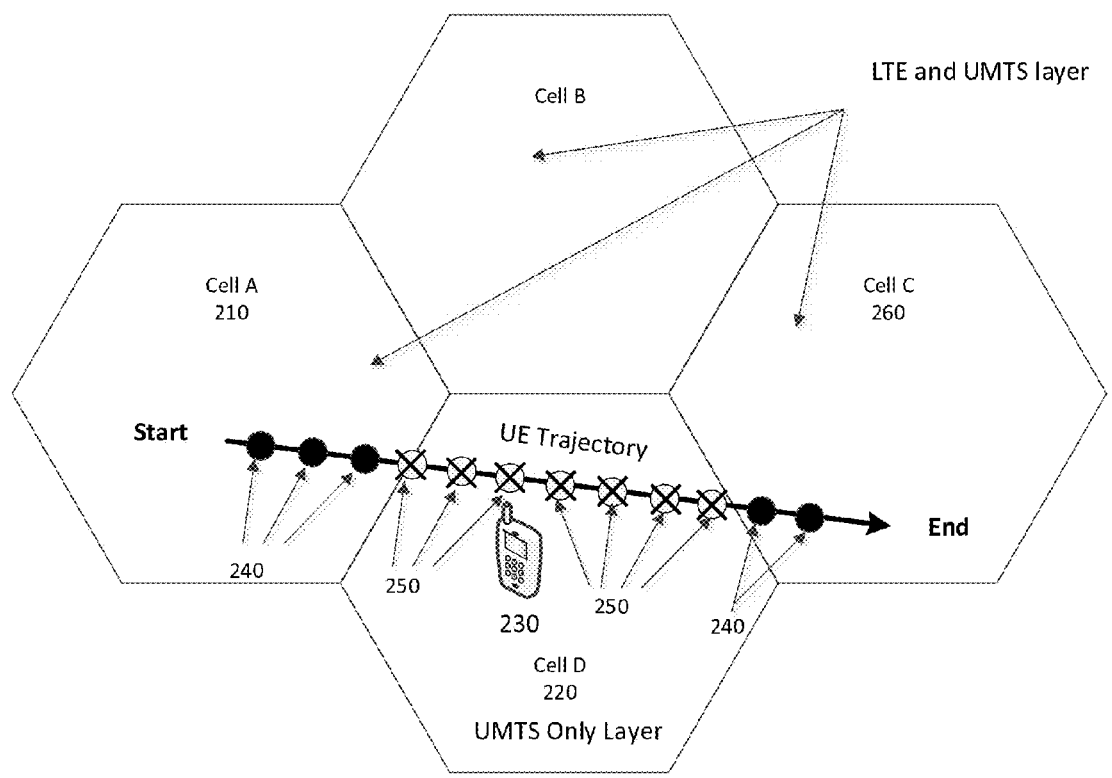
FIG. 2A depicts minimization of drive test (MDT) measurements taken by UE in accordance with an example.
Figure 2B:
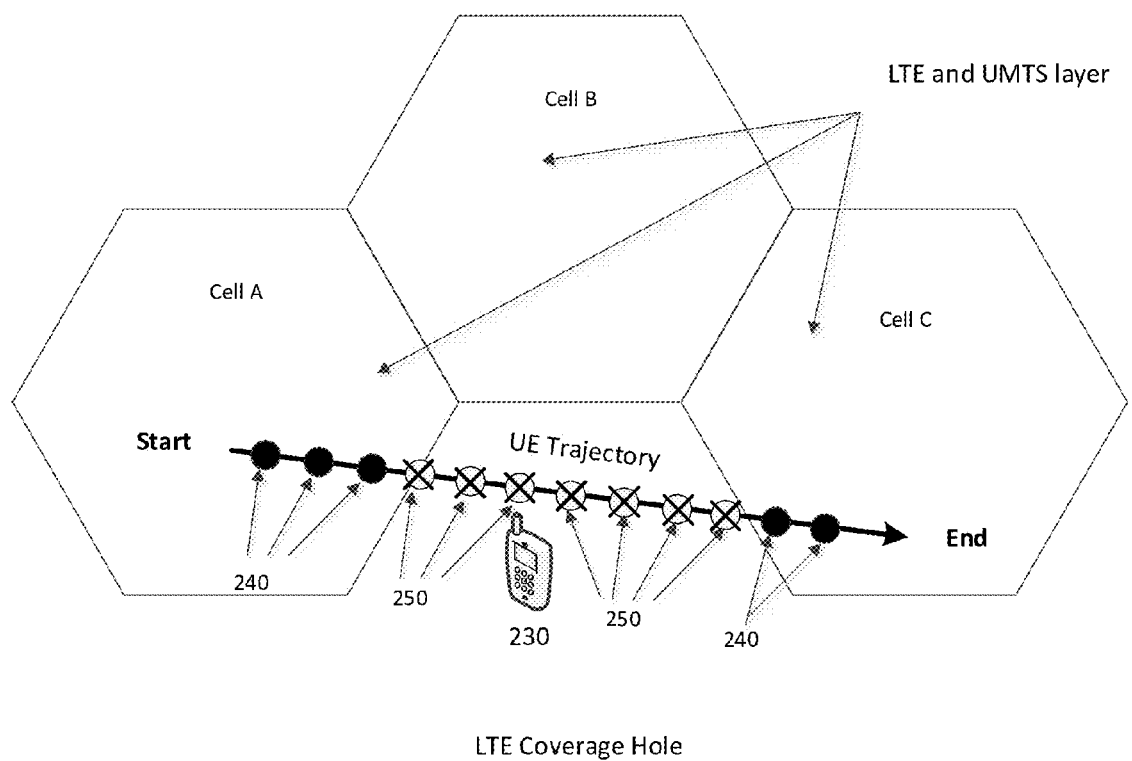
FIG. 2B depicts minimization of drive test (MDT) measurements taken by UE as the UE moves through a 3GPP LTE coverage hole in accordance with an example.

Traditionally, a UE is configured to continuously collect data samples, such as downlink signal strength measurements, to use for coverage hole determination. In one embodiment, the UE can take MDT measurements during selected periods of time. FIG. 2A shows MDT measurements 240 taken by UE 230 as it moves through cells on a UE trajectory. The UE 230 can initially take periodical or continuous MDT measurements 240 while the UE 230 is located in Cell A 210, wherein Cell A 210 is a cell with 3GPP LTE coverage and UMTS coverage. When the UE 230 switches to a cell with no 3GPP LTE coverage, such as Cell D 220, the UE 230 is configured to pause or stop taking MDT measurements 250. When the UE 230 moves to another cell with 3GPP LTE coverage, such as Cell C 260, the UE 230 is configured to resume periodically or continuously taking MDT measurements 240. FIG. 2B shows MDT measurements 240 taken by UE 230 as it moves through cells on a UE trajectory and a pause or stopping of taking MDT measurements 250 as the UE 230 moves through a 3GPP LTE coverage hole. FIG. 2B is the same as FIG. 2A in all other regards. In one embodiment, the UE can pause taking MDT measurements when the UE leaves a cell with 3GPP LTE coverage and resume taking MDT measurements when the UE returns to the same cell with 3GPP LTE coverage. In another embodiment, coverage holes can be detected by identifying a pattern a stopping and resuming of MDT measurements. In another embodiment, a size or a boundary of the coverage hole can be determined by the location where the UE stops taking the MDT measurements and the location where the UE resumes taking the MDT measurements.

Figure 3:
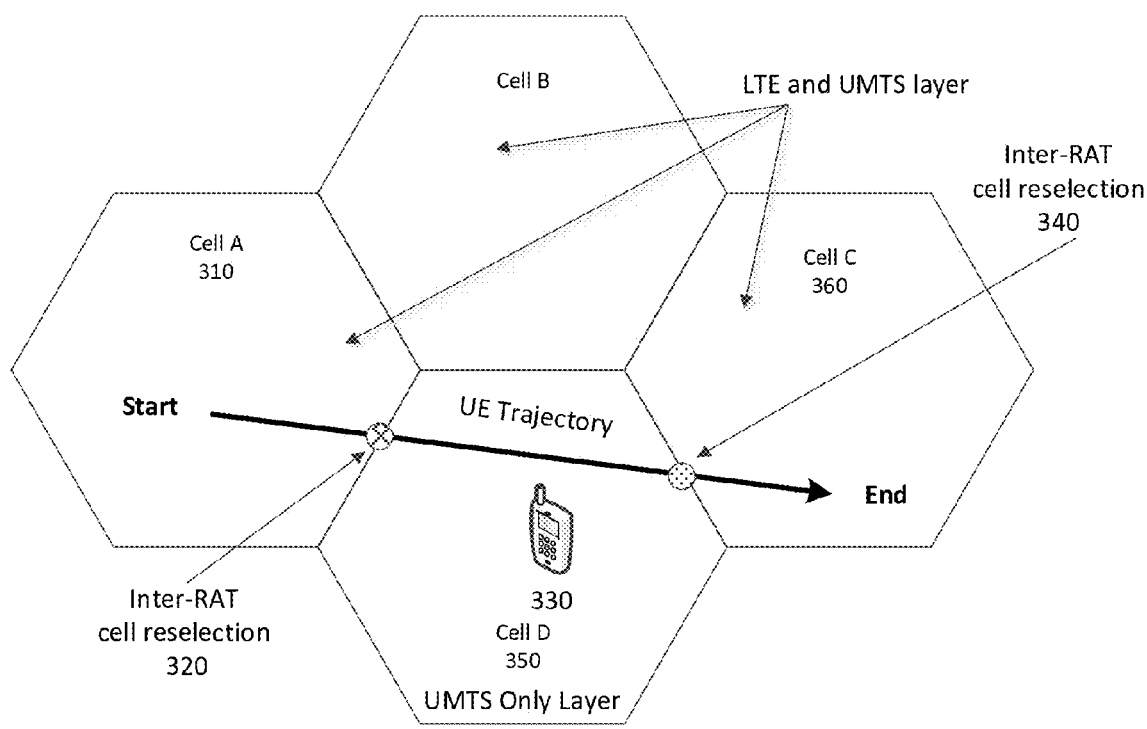
FIG. 3 shows that the user equipment (UE) can collect Logged MDT measurements at trigger events in accordance with an example.

In another embodiment, the UE can take MDT measurements at selected events. FIG. 3 illustrates that the UE 330, traveling along a UE trajectory, can collect Logged MDT measurements at trigger events 320 and 340. The trigger events 320 and 340 can include: the UE switching from a 3GPP LTE node 310 to a non-3GPP LTE node 350, such as a UTMS node; the UE switching from a non-3GPP LTE node 350 to a 3GPP LTE node 310 or 360; the UE leaving a cellular network, such as when the UE enters an area not covered by the network; and when the UE returns to a cellular network, such as when the UE returns to an area covered by the network.

One advantage of collecting Logged MDT measurements at a trigger event can be to reduce or minimize the number of data measurements taken to determine coverage holes. For example, when a trigger event does not occur, the UE does not take any MDT measurements to determine coverage holes. In another example, when a trigger event occurs, the UE can take individual MDT measurements when the trigger event occurs.

Another advantage of collecting Logged MDT measurements at a trigger event can be to increase the number of MDT measurements a UE can store in a memory of the UE. For example, where the UE takes Logged MDT measurements when a trigger event occurs, the UE can store an decreased number of MDT measurements to be used for coverage hole determination compared to continuously taking data measurements for the same period of time and/or for the same number of coverage holes.

Figure 4:
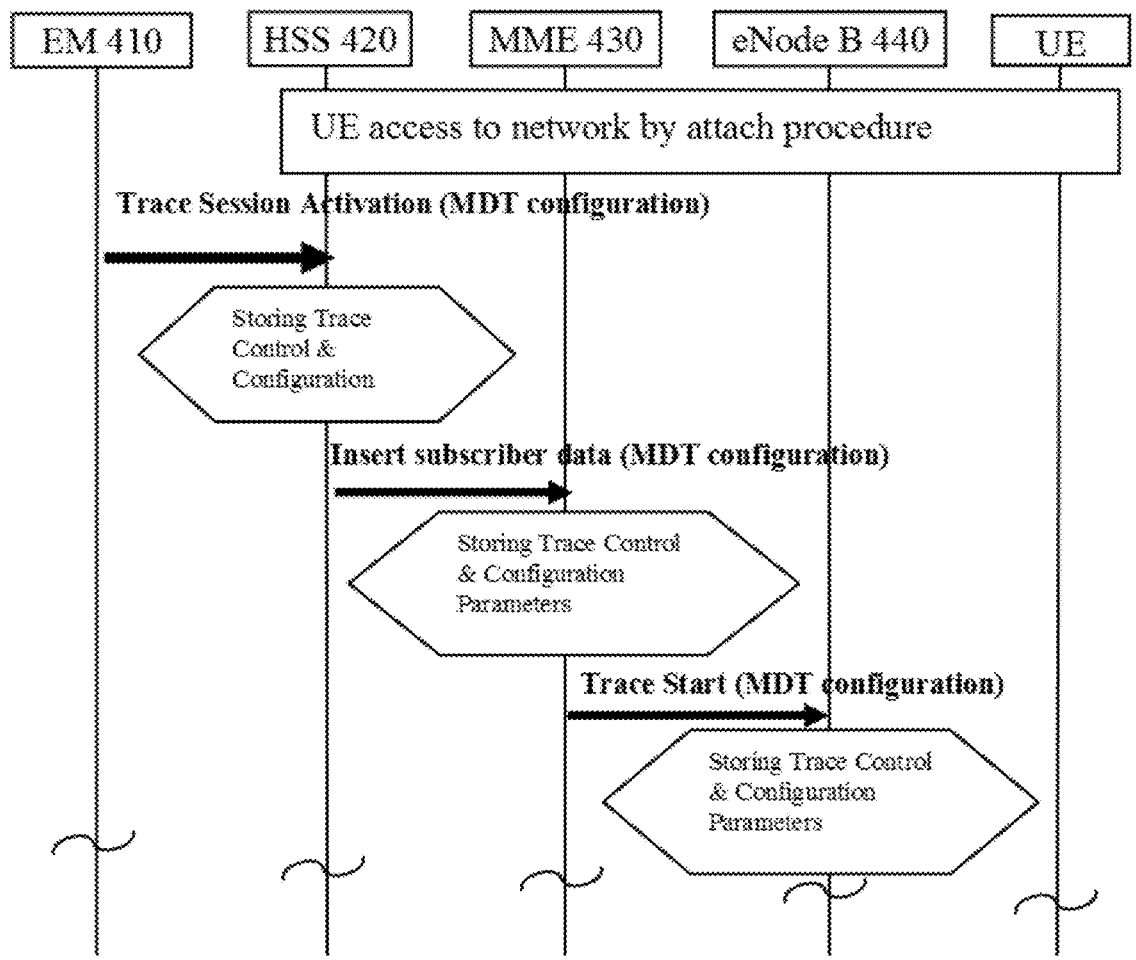
FIG. 4 shows sending MDT configuration information from an element manager (EM) to an enhanced Node B (eNode B) in accordance with an example.

In one embodiment, for a trace-based MDT configuration, at least one new parameter can be used to configure and control CCO SON operations in a UE, i.e. detecting inter-RAT cell reselection events. FIG. 4 shows sending MDT configuration information from an element manager (EM) 410 to an eNode B 440. In one embodiment, a trace session activation message can include MDT configuration information. FIG. 4 shows that the trace session activation message, which includes MDT configuration information, can be sent from an EM 410 to a home subscriber server (HSS) 420. The HSS 420 stores trace control and configuration information and sends insert subscriber data, which includes MDT configuration information, to a mobility management entity (MME) 430. The MME 430 stores trace control and configuration parameters and sends a trace start message, which includes MDT configuration information, to the eNode B 440. In one embodiment, the MDT configuration of the trace start message can include S1 application protocol (S1AP).

FIGS. 5 and 6 show a table of parameters of an IE for the CCO SON in an MDT configuration. FIG. 6 is a continuation of the table in FIG. 5. FIGS. 5 and 6 further show the IE for the CCO SON that can be used as part of a Logged MDT configuration. Additionally, FIG. 6 shows a table where the S1AP includes a parameter to turn a CCO SON measurement on and off. In one embodiment, the S1AP can include information on the expected actions taken by the UE when the UE receives the S1AP information. For example, the S1AP can include information on whether the UE will take a reference signal received power (RSRQ) measurement or a reference signal received power (RSRP) measurement. In another embodiment, the S1AP can include trigger event information to configure the UE to take MDT measurements at selected periods of time, such as logging interval configuration information. In one embodiment, the S1AP can include trigger threshold values. In another embodiment, the S1AP can include trigger event information to configure the UE to take MDT measurements at selected trigger event.

In one embodiment, the selected trigger event can be an inter-RAT cell reselection trigger event. For example, the inter-RAT cell reselection trigger event can be when a UE in RRC idle mode changes from a camped normally mode to a camped on any cell mode, e.g. the UE moves from an LTE cell to a UMTS cell. In another example, the inter-RAT cell reselection trigger event can be when a UE in RRC idle mode changes from a camped on any cell mode to a camped normally mode, e.g. the UE returns from a non-LTE cell to an LTE cell.

In one embodiment, the selected trigger event can be an LTE coverage hole detection trigger event. For example, the LTE coverage hole detection trigger event can be when a UE in RRC idle mode changes from a camped normally mode to an any cell selection mode, e.g. the UE moves from an LTE cell to a coverage hole. For example, the LTE coverage hole detection trigger event can be when a UE in an RRC idle mode changes from an any cell selection mode to a camped normally mode, e.g. a UE returns to an LTE cell.

In one embodiment, coverage holes, such as LTE coverage holes, can be detected using LTE inter-RAT cell reselection measurements, including Logged MDT UE measurements such as RSRP measurements and/or RSRQ measurements. In one embodiment, the RSRP measurements or the RSRQ measurements can include cell identification (Cell ID) information and/or location information. In another embodiment, the RSRP measurements or the RSRQ measurements can include trigger event information such as when a UE in RRC idle mode changes from a camped normally mode to a camped on any cell mode or when the UE changes from a camped on any cell mode to a camped normally mode. In one embodiment, the UE can communicate location information to an eNode B, network node, or network server when an LTE inter-RAT cell reselection event occurs.

In one embodiment, coverage holes, such as LTE coverage holes, can be detected using LTE coverage hole detection, including Logged MDT UE measurements such as an RSRP measurement or an RSRQ measurement. In one embodiment, the RSRP measurement or the RSRQ measurement can include cell identification (Cell ID) information and/or location information. In another embodiment, the RSRP measurement or the RSRQ measurement can include trigger event information such as when a UE in an RRC idle mode changes from a camped normally mode to an any cell selection mode or when the UE changes from an any cell selection mode to a camped normally mode. In one embodiment, the UE can be configured to communicate location information to an eNode B, network node, or network server when an LTE coverage hole event occurs.

FIGS. 7 and 8 show another table of parameters of an IE for the CCO SON in a MDT configuration. FIG. 8 is a continuation of the table in FIG. 7. FIGS. 7 and 8 further show the IE for the CCO SON that can be inserted independently into the CCO SON from existing MDT modes. For example, the IE for the CCO SON in a MDT configuration can be used to configure another mode of MDT operation, e.g. not an Immediate MDT mode or a Logged MDT mode. Additionally, FIG. 8 shows a table with a set of CCO SON parameters. FIG. 8 further shows an information element (IE) for a CCO SON, such as a single parameter or a container, in the MDT Configuration IE that is defined in 3GPP TS 36.413 v11.6.0 (December 2012).

Figure 9:
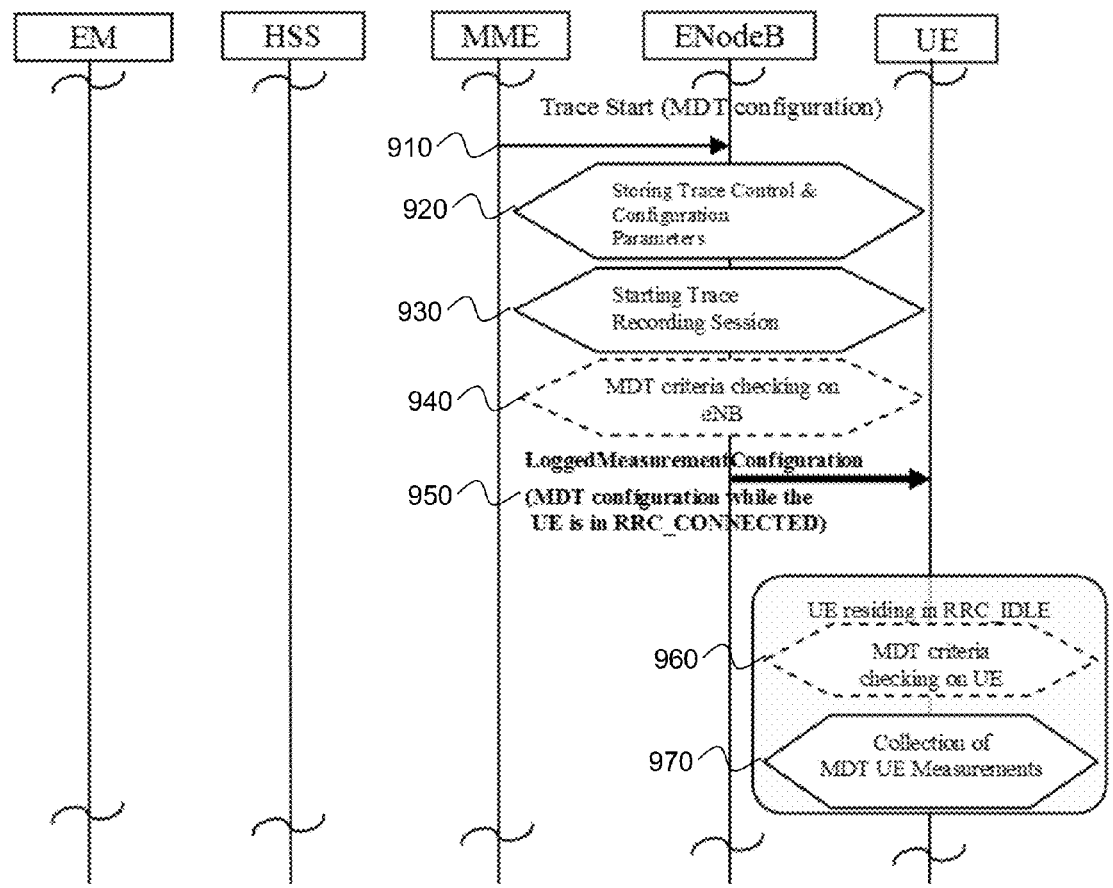
FIG. 9 shows a framework for configuring a UE with a Logged MDT in accordance with an example.

FIG. 9 shows a framework for configuring a UE with a Logged MDT. The MME can send a trace start message that includes MDT configuration information to an eNode B, as shown in block 910. The eNode B can store trace control and configuration parameters, as shown in block 920. The eNode B can start a trace recording session, as shown in block 930. MDT criteria can be checked at the eNode B, as shown in block 940. The eNode B can send a logged measurement configuration RRC message to the UE while the UE is in an RRC connected mode, as shown in block 950. In one embodiment the logged measurement configuration RRC message can be used by an E-UTRAN to configure the UE to perform logging of MDT measurement results while the UE is in an RRC idle mode. In one embodiment, the RRC message can be used by the E-UTRAN to configure the UE to perform logging of measurement results while in the UE is in an RRC idle mode. MDT criteria checking can be performed at the UE while the UE is in an RRC idle mode, as shown in block 960. MDT measurements can be taken by the UE, as shown in block 970.

FIG. 10 shows Abstract Syntax Notation (ASN) programming code used to modify a logged measurement configuration RRC message. The ASN code section for the CCO SON configuration parameters represents the CCO SON in the MDT Configuration IE, as discussed in the preceding paragraphs for FIG. 6. The programming code assumes that a signaling radio bearer is SRB1, a radio link control service access point (RLC-SAP) is an acknowledged mode (AM) SAP, a logical channel is a dedicated control channel (DCCH), and the logged measurement configuration RRC message direction is from an eNode B to a UE. The ASN code section for the LoggedMeasurementConfiguration-r10 represents the LoggedMeasurementConfiguration, as discussed in the preceding paragraphs for FIG. 9.

Figure 11:
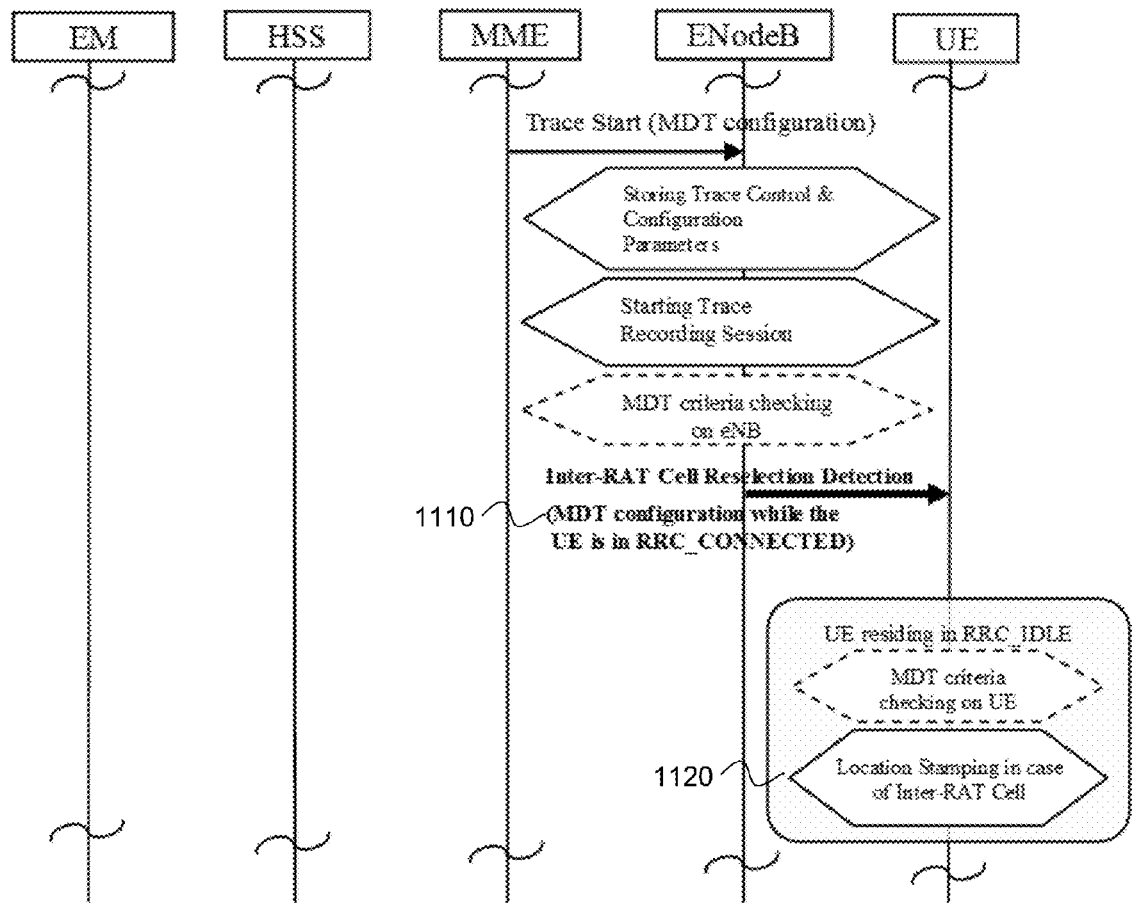
FIG. 11 shows a framework for configuring a UE with a Logged MDT in accordance with an example.

FIG. 11 shows a framework for configuring a UE with a Logged MDT. The eNode B can send an inter-RAT cell reselection detection message to the UE while the UE is in an RRC connected mode, as shown in block 1110. The UE can location stamp the MDT measurement data, as shown in block 1120. The other blocks in FIG. 11 are the same as discussed in the preceding paragraphs for FIG. 9.

FIG. 12 shows ASN programming code used to modify an inter-RAT cell reselection detection message. The ASN code section for the CCO SON configuration parameters can be used to detect coverage holes, as discussed in the preceding paragraphs for FIG. 6. The programming code assumes that a signaling radio bearer is SRB1, a radio link control service access point (RLC-SAP) is an acknowledged mode (AM) SAP, a logical channel is a dedicated control channel (DCCH), and the logged measurement configuration RRC message direction is from an E-UTRAN to a UE.

In one embodiment, the UE can create an MDT measurement log with location information. In another embodiment, the UE can create an MDT measurement log with RF fingerprint information when a cell reselection event (CRE) is detected. The CRE can include an inter-RAT cell reselection trigger event and/or LTE coverage hole detection trigger event. The inter-RAT cell reselection trigger event can be when a UE in RRC idle mode moves from a 3GPP LTE cell to a non-3GPP LTE cell, such as a UMTS cell, and vice versa. The LTE coverage hole detection trigger event can occur when a UE in an RRC idle mode moves from a 3GPP LTE cell to a coverage hole and vice versa.

In one embodiment, the UE can include trace specific details in the measurement log. The trace specific details can include trace reference information, trace recording session reference information, or trace collection entity identification (TCE-Id) information. In one embodiment, the UE can include CRE details in the measurement log. The CRE details can include a Boolean variable designated as a public land mobile network (PLMN) change. When the PLMN change Boolean variable is true, the PLMN Change indicates a reselection to a different PLMN. When the PLMN change Boolean variable is false, the PLMN Change indicates a reselection within the same PLMN. In one embodiment, the UE can stop collecting cell reselection event information when a maximum number of CREs has been reached.

Figure 13:
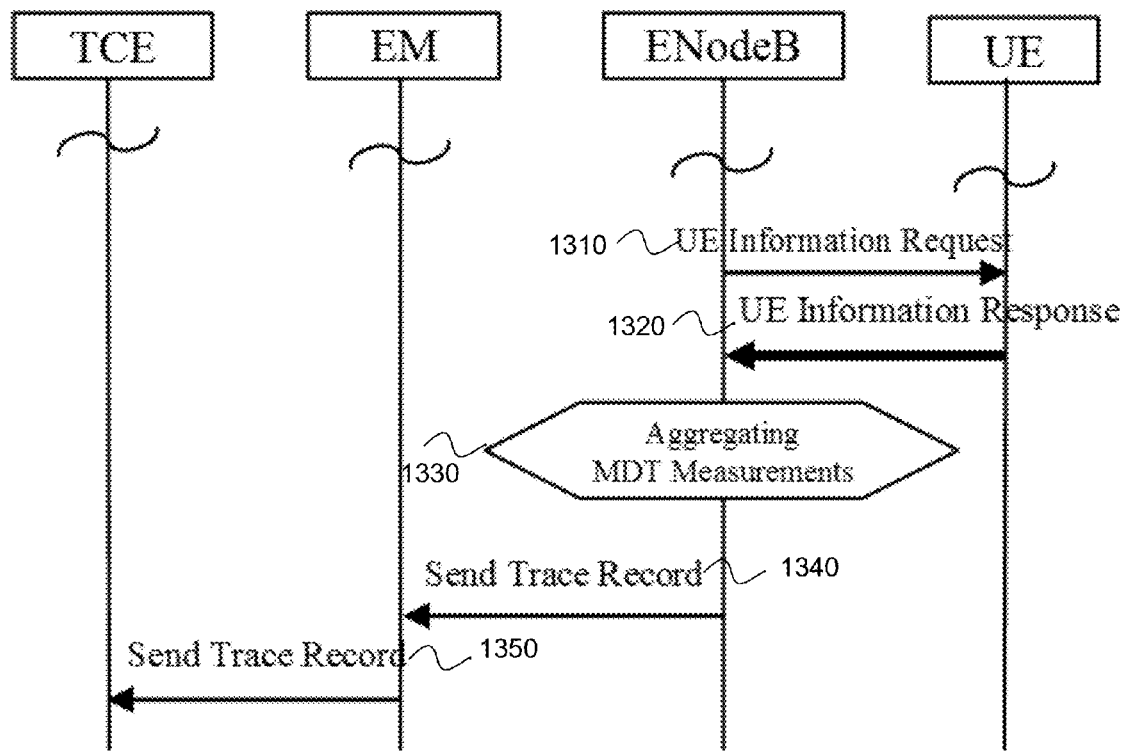
FIG. 13 shows a framework for a UE to send a UE information response RRC message to an eNode B in accordance with an example.

FIG. 13 shows a framework for a UE to send a UE information response RRC message to an eNode B. In one embodiment, the UE can send the UE information response RRC message to an eNode B based on a request from the network. The eNode B can send a UE information request to the UE, as in block 1310. The UE can send a UE information response to the eNode B, as in block 1320. The eNode B can aggregate the MDT measurements from the UE, as show in block 1330. The eNode B can send a trace record to an EM, as in block 1340. The EM can send the trace record to a TCS, as in block 1350.

FIGS. 14A-14C shows an exemplary embodiment of ASN programming code used to modify a UE information response message. FIG. 14B is a continuation of the programming code in FIG. 14A. FIG. 14C is a continuation of the programming code in FIG. 14B. The ASN code section in FIGS. 14A-14C disclose ASN code for a type of CRE and a PLMN change in a UE measurement log, as discussed in the preceding paragraphs. The programming code assumes that a signaling radio bearer is SRB1 or SRB2, a radio link control service access point (RLC-SAP) is an acknowledged mode (AM) SAP, a logical channel is a dedicated control channel (DCCH), and the logged measurement configuration RRC message direction is from a E-UTRAN to a UE. In one embodiment, the signaling radio bearer can be SRB2 when MDT measurements are included in the UE information response message.

FIGS. 15A-15C shows another exemplary embodiment of ASN programming code used to modify a UE information response message. FIG. 15B is a continuation of the programming code in FIG. 15A. FIG. 15C is a continuation of the programming code in FIG. 15B. The programming code assumes that a signaling radio bearer is SRB1 or SRB2, a radio link control service access point (RLC-SAP) is an acknowledged mode (AM) SAP, a logical channel is a dedicated control channel (DCCH), and the logged measurement configuration RRC message direction is from a E-UTRAN to a UE. In one embodiment, the signaling radio bearer is SRB2 when MDT measurements are included in the UE information response message. The ASN code section for a CCOSONReport and a CCOSONResult represents the UEInformationResponse, as shown in FIG. 15A, and corresponds to the UE information response, as discussed in the preceding paragraphs for FIG. 13.

Returning to FIG. 13, the UE can collect the MDT measurements in the current configuration of the UE while the UE is in an RRC idle mode. When the UE returns to an RRC connected mode, the UE can indicate an MDT log availability to the eNode B using an RRC connection setup complete RRC message. When the eNode B receives the RRC connection setup complete RRC message, the eNode B can request the MDT log by sending a UE information request RRC message to the UE. In one embodiment, the MDT logs can be sent to the eNode in a UE information response RRC message. When the eNode B receives the UE information response RRC message, the eNode B can save the received MDT log(s) and create a trace record.

In one embodiment, the trace records can be sent to the TCE using a core network message sequence, as shown in FIG. 13. In one embodiment, a core network entity, such as the TCE, EM, or eNode B in FIG. 13, can be combined with another core network entity or reside in another core network entity.

In one embodiment, a time and procedure for when the trace records are sent to the TCE can be vendor specific. In another embodiment, when the trace session is deactivated, the trace records can be sent to the TCE within a selected time period, such as two hours, of the trace session deactivation.

FIG. 16 shows a table of trace-based MDT reporting parameters to inform a TCE about MDT measurements that were collected by a UE in a CCO SON. In one embodiment, the MDT reports for the CCO SON can be communicated from the eNode B via the EM to the TCE.

Figure 17:
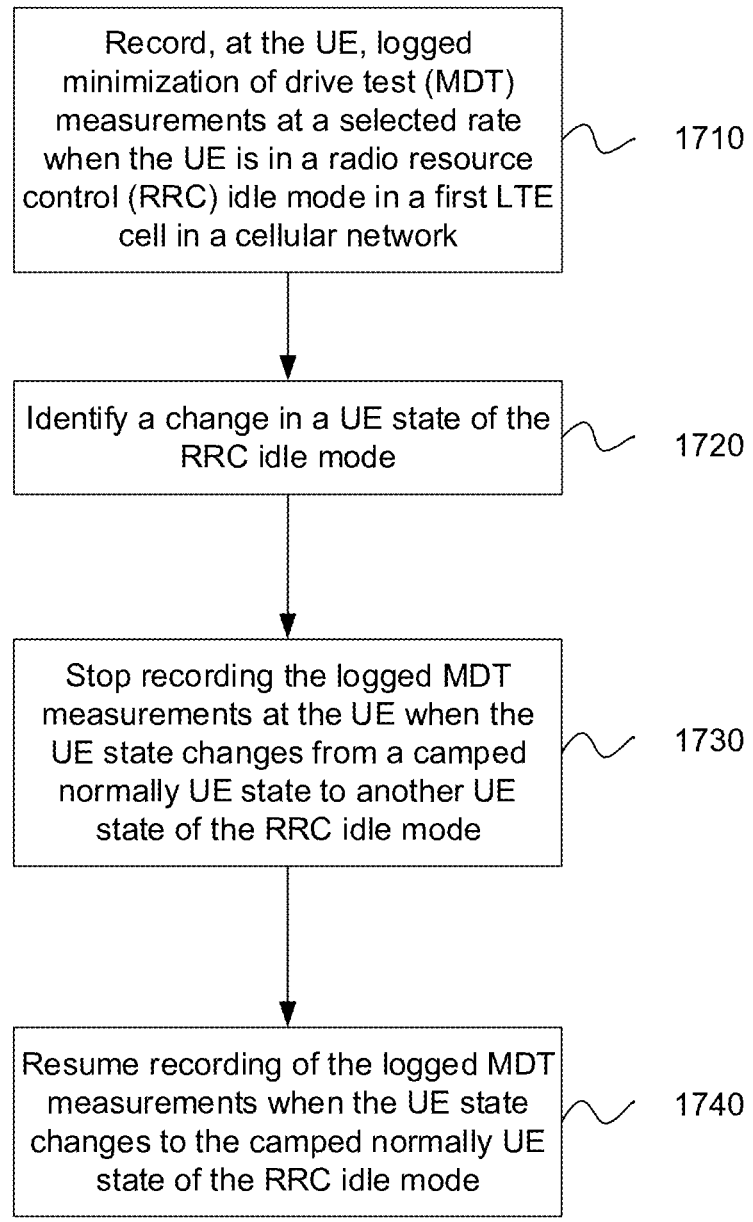
FIG. 17 depicts the functionality of another computer circuitry with a UE operable to connect to a 3GPP LTE cell in a cellular network in accordance with an example.

Another example provides functionality 1700 of computer circuitry of a UE that is operable to connect to a 3GPP LTE cell in a cellular network, as shown in the flow chart in FIG. 17. The functionality may be implemented as a method or the functionality may be executed as instructions on a machine, where the instructions are included on at least one computer readable medium or one non-transitory machine readable storage medium. The computer circuitry can be configured to record, at the UE, Logged MDT measurements at a selected rate when the UE is in a radio resource control (RRC) idle mode in a first LTE cell in a cellular network, as in block 1710. The computer circuitry can be further configured to identify a change in a UE state of the RRC idle mode, as in block 1720. The computer circuitry can also be configured to stop recording the Logged MDT measurements at the UE when the UE state changes from a camped normally UE state to another UE state of the RRC idle mode, as in block 1730. The computer circuitry can also be configured to resume recording of the Logged MDT measurements when the UE state changes to the camped normally UE state of the RRC idle mode, as in block 1740.

In one embodiment, the computer circuitry can be further configured to communicate the Logged MDT measurements to the communications network to enable the communications network to derive spatial information about cell boundaries in the communications network. In another embodiment, the MDT measurements are used to determine an LTE coverage hole in the cellular network. In another embodiment, the computer circuitry can be further configured to collect the MDT measurements for a CCO SON function to identify the LTE coverage hole in the cellular network. In another embodiment, the MDT measurement includes RSRP information, RSRQ information, Cell-Id information, location information, or time stamp information for an inter-RAT handover.

In one embodiment, the UE state changes from the camped normally UE state to another UE state at an inter-RAT handover from the 3GPP LTE cell to a UTRAN. In another embodiment, the computer circuitry can be further configured to stop recording the MDT measurements at the UE when the UE state changes from the camped normally UE state to an any cell selection UE state or a camped on any cell UE state. In another embodiment, the computer circuitry can be further configured to stop recording the MDT measurements at the UE when the UE enters a non-LTE cell, wherein the non-LTE cell is a cell in a universal terrestrial radio access network UTRAN or a cell in a global system for mobile communications (GSM) enhanced data rates for GSM evolution (EDGE) radio access network (GERAN). In another embodiment, the UE includes an antenna, a camera, a touch sensitive display screen, a speaker, a microphone, a graphics processor, an application processor, internal memory, or a non-volatile memory port.

Figure 18:
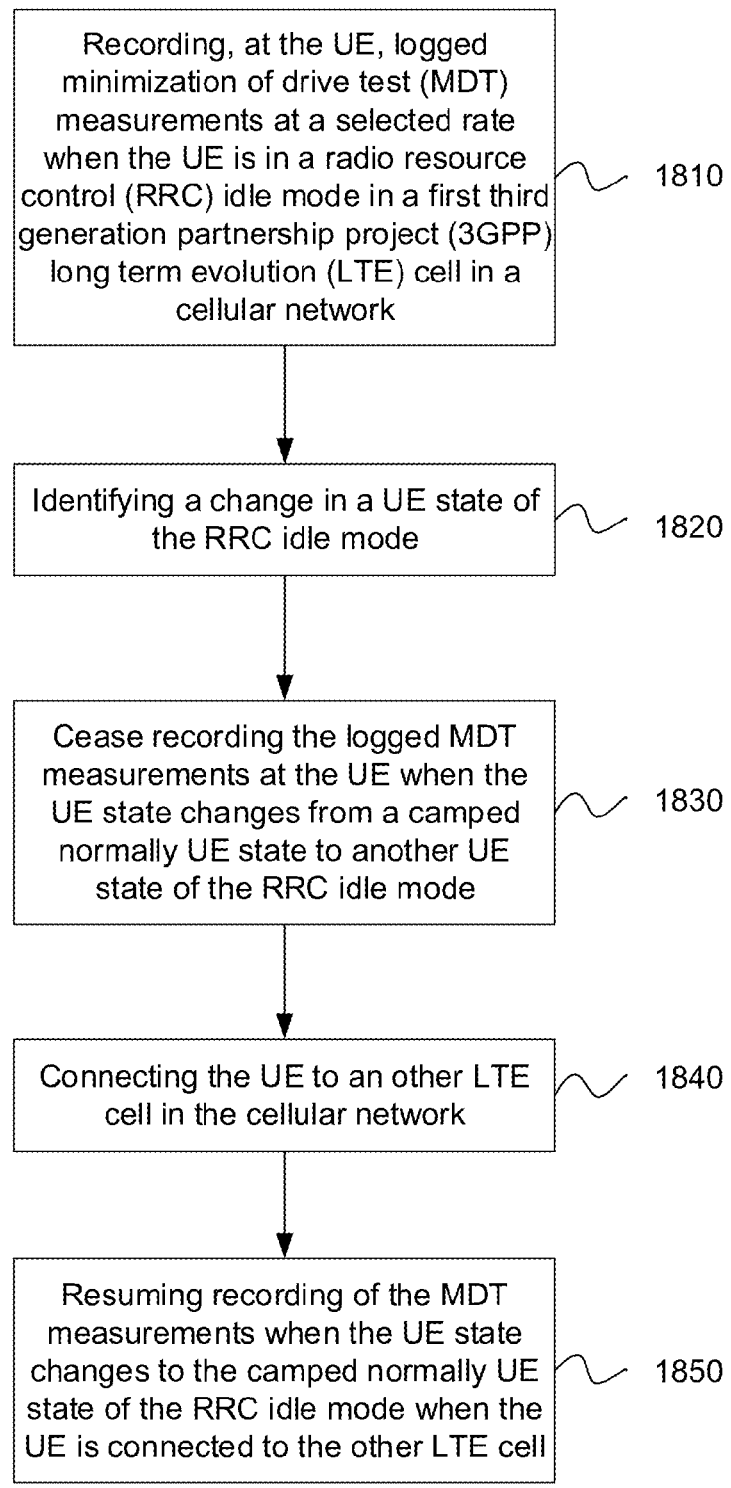
FIG. 18 depicts a method to record MDT measurements at a UE in a cellular network in accordance with an example.

FIG. 18 uses a flow chart 1800 to illustrate a method to record MDT measurements at a UE in a cellular network. The method can comprise recording, at the UE, Logged MDT measurements at a selected rate when the UE is in a RRC idle mode in a first 3GPP LTE cell in a cellular net, as in block 1810. The method can further comprise identifying a change in a UE state of the RRC idle mode, as in block 1820. The method can further comprise cease recording the Logged MDT measurements at the UE when the UE state changes from a camped normally UE state to another UE state of the RRC idle mode, as in block 1830. The method can further comprise connecting the UE to an other LTE cell in the cellular network, as in block 1840. The method can further comprise resuming recording of the MDT measurements when the UE state changes to the camped normally UE state of the RRC idle mode when the UE is connected to the other LTE cell, as in block 1850.

In one embodiment, the method can further comprise associating each state change recorded by the UE with a location stamp. In another embodiment, the location stamp includes global navigation satellite system (GNSS) information or RF fingerprint information. In another embodiment, the ceasing recording of the Logged MDT measurements and the resuming of the Logged MDT measurements is used by the cellular network to derive spatial information about cell boundaries in the communications network. In one embodiment, the method can further comprise receiving, at the UE, a UE information request RRC message from an eNode B requesting the recorded MDT measurements, and sending, to the eNode B, a UE information response RRC message that includes the recorded MDT measurements. In another embodiment, the selected rate to record Logged MDT measurements is a continuous, a semi-continuous, or a periodic rate.

In one embodiment, the selected rate to record Logged MDT measurements is a single measurement when the UE state changes from a camped normally UE state to an other UE state of the RRC idle mode and a single measurement when the UE state changes from the other UE state to the camped normally UE state of the RRC idle mode. In another embodiment, the change in the UE state occurs during an inter-RAT cell reselection by the UE. In one embodiment, the method can further comprise receiving, at the UE, a logged measurement configuration radio resource control (RRC) message from an eNode B. In another embodiment, the logged measurement configuration RRC message includes CCO SON control information. In another embodiment, the method can further comprise receiving, at the UE, an inter-RAT cell reselection detection RRC message from an eNode B, and changing the UE state from the camped normally UE state of the RRC idle mode to the other UE state of the RRC idle mode based on the reselection detection RRC message.

Figure 19:
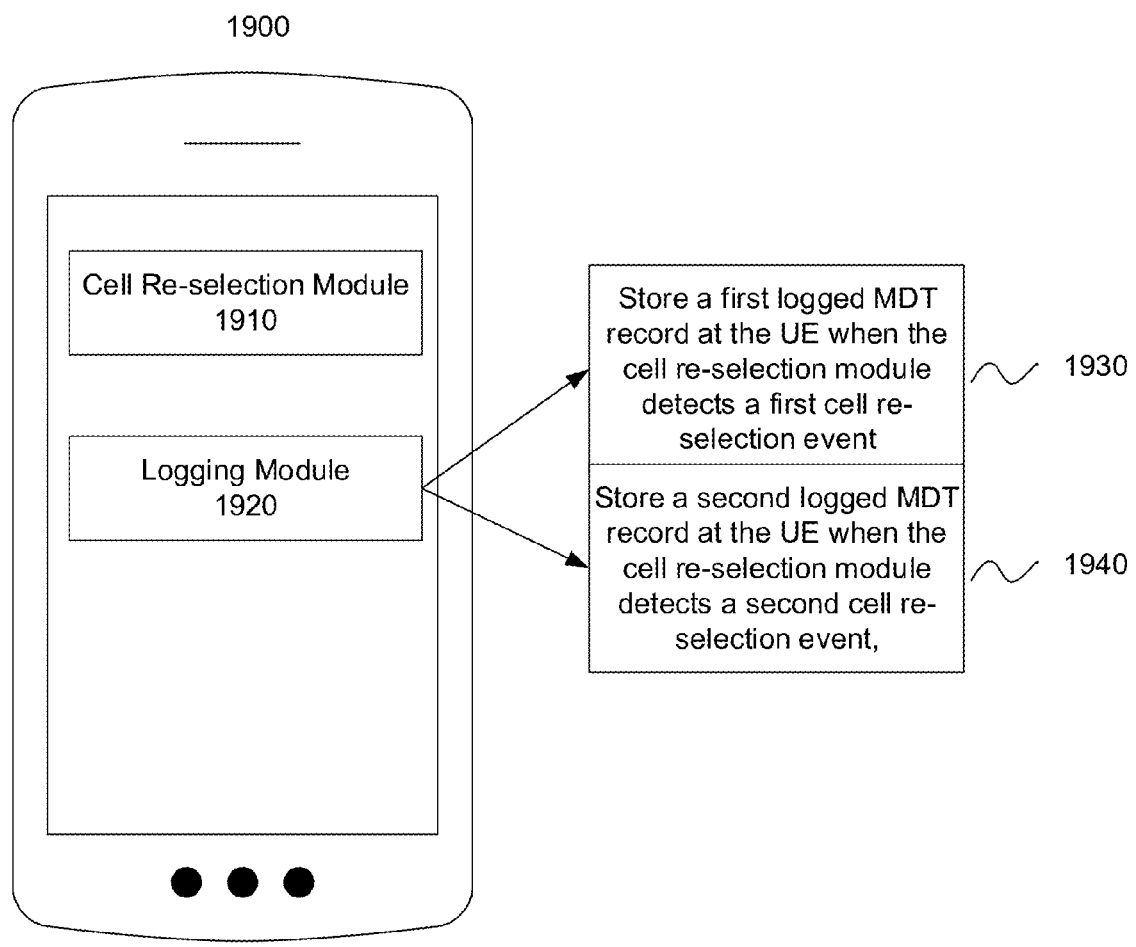
FIG. 19 depicts a UE for use in a communications network in accordance with an example.

FIG. 19 shows a UE 1900 for use in a communications network. The UE can include a cell reselection module 1910 for detecting cell re-selection events. The UE can also include a logging module 1920 for storing a logged minimization of drive test (MDT) record when selected cell re-selection events are detected by the cell re-selection module. In one embodiment, the logging module can be configured to store a first Logged MDT record at the UE when the cell re-selection module detects a first cell re-selection event, as shown in block 1930. In one embodiment, the logging module can be configured to store a second Logged MDT record at the UE when the cell re-selection module detects a second cell re-selection event, as shown in block 1940. The first Logged MDT record and the second Logged MDT record can be used to identify cell boundaries in the communications network.

In one embodiment, the first cell re-selection event is the UE moving from a 3GPP LTE cell to a UMTS cell and the second cell re-selection event is the UE moving from the UMTS cell to an other LTE cell. In another embodiment, the first cell re-selection event is the UE moving from an LTE cell to a coverage hole and the second cell re-selection event is the UE moving from the coverage hole to an other LTE cell. In another embodiment, the UE can be configured to collect the MDT measurements for a CCO SON function to identify the LTE coverage hole in the cellular network. In one embodiment, the coverage hole is an area where a pilot signal strength is below a selected threshold value for the UE to access the cellular network. In another embodiment, the UE can further comprise a receiver module 1950 for receiving a UE information request from an eNode B requesting the Logged MDT record and a transmitting module 1960 for sending a UE information response that includes the Logged MDT record to the eNode B.

Figure 20:
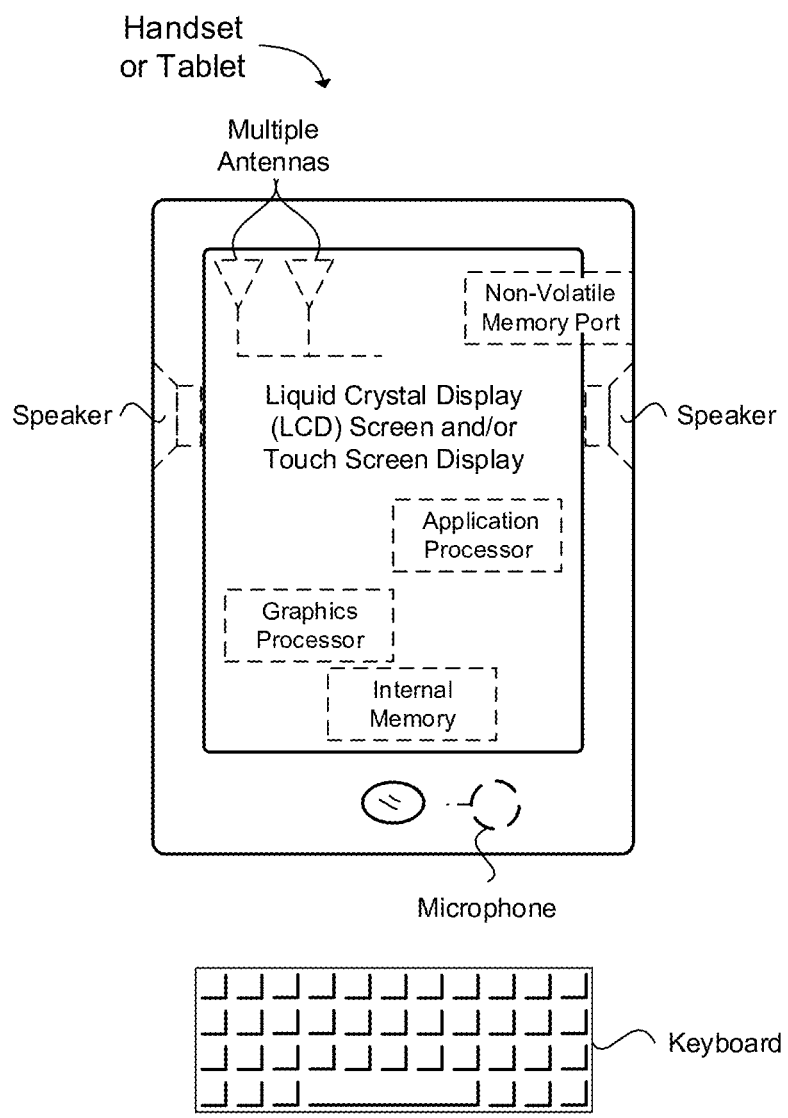
FIG. 20 illustrates a diagram of a user equipment (UE) in accordance with an example.

FIG. 20 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 20 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to connect to a third generation partnership project (3GPP) long term evolution (LTE) cell in a cellular network, having computer circuitry configured to:
    record, at the UE, logged minimization of drive test (MDT) measurements at a selected rate when the UE is in a radio resource control (RRC) idle mode in a first LTE cell in a cellular network;
    communicate the Logged MDT measurements to a communications network to enable the communications network to derive spatial information about cell boundaries in the communications network;
    identify a change in a UE state of the RRC idle mode;
    stop recording the Logged MDT measurements at the UE when the UE state changes from a camped normally UE state to another UE state of the RRC idle mode; and
    resume recording of the Logged MDT measurements when the UE state changes to the camped normally UE state of the RRC idle mode.

2. The computer circuitry of claim 1, wherein the MDT measurements are used to determine an LTE coverage hole in the cellular network.

3. The computer circuitry of claim 2, further configured to collect the MDT measurements for a coverage and capacity optimization (CCO) self-organizing network (SON) function to identify the LTE coverage hole in the cellular network.

4. The computer circuitry of claim 1, wherein the MDT measurement includes reference signal received power (RSRP) information, reference signal received quality (RSRQ) information, cell identification (ID) information, location information, or time stamp information for an inter-radio access technology (RAT) handover.

5. The computer circuitry of claim 1, wherein the UE state changes from the camped normally UE state to another UE state at an inter-radio access technology (RAT) handover from the 3GPP LTE cell to a different RAT.

6. The computer circuitry of claim 1, further configured to stop recording the MDT measurements at the UE when the UE state changes from the camped normally UE state to an any cell selection UE state or a camped on any cell UE state.

7. The computer circuitry of claim 6, further configured to stop recording the MDT measurements at the UE when the UE enters a non-LTE cell, wherein the non-LTE cell is a cell in a universal terrestrial radio access network (UTRAN) or a cell in a global system for mobile communications (GSM) enhanced data rates for GSM evolution (EDGE) radio access network (GERAN).

8. The computer circuitry of claim 1, wherein the UE includes an antenna, a camera, a touch sensitive display screen, a speaker, a microphone, a graphics processor, an application processor, internal memory, or a non-volatile memory port.

9. A method to record minimization of drive test (MDT) measurements at a user equipment (UE) in a cellular network, comprising:
- recording, at the UE, logged minimization of drive test (MDT) measurements at a selected rate when the UE is in a radio resource control (RRC) idle mode in a first third generation partnership project (3GPP) long term evolution (LTE) cell in a cellular network;
- identifying a change in a UE state of the RRC idle mode;
- cease recording the Logged MDT measurements at the UE when the UE state changes from a camped normally UE state to another UE state of the RRC idle mode;
- connecting the UE to another LTE cell in the cellular network; and resuming recording of the MDT measurements when the UE state changes to the camped normally UE state of the RRC idle mode when the UE is connected to the other LTE cell,
- wherein the ceasing recording of the Logged MDT measurements and the resuming of the Logged MDT measurements is used by the cellular network to derive spatial information about cell boundaries in a communications network.

10. The method of claim 9, further comprising associating each state change recorded by the UE with a location stamp.

11. The method of claim 10, wherein the location stamp includes global navigation satellite system (GNSS) information or radio frequency (RF) fingerprint information.

12. The method of claim 9, further comprising:
- receiving, at the UE, a UE information request radio resource control (RRC) message from an evolved Node B (eNode B) requesting the recorded MDT measurements; and
- sending, to the eNode B, a UE information response RRC message that includes the recorded MDT measurements.

13. The method of claim 9, wherein the selected rate to record Logged MDT measurements is a continuous, a semi-continuous, or a periodic rate.

14. The method of claim 9, wherein the selected rate to record Logged MDT measurements is a single measurement when the UE state changes from a camped normally UE state to an other UE state of the RRC idle mode and a single measurement when the UE state changes from the other UE state to the camped normally UE state of the RRC idle mode.

15. The method of claim 9, wherein the change in the UE state occurs during an inter radio access technology (RAT) cell reselection by the UE.

16. The method of claim 9, further comprising receiving, at the UE, a logged measurement configuration radio resource control (RRC) message from an evolved node B (eNode B).

17. The method of claim 16, wherein the logged measurement configuration RRC message includes coverage and capacity optimization (CCO) self-organizing network (SON) control information.

18. The method of claim 9, further comprising:
- receiving, at the UE, an inter radio access technology (RAT) cell reselection detection radio resource control (RRC) message from an evolved node B (eNode B); and
- changing the UE state from the camped normally UE state of the RRC idle mode to the other UE state of the RRC idle mode based on the reselection detection RRC message.

19. A user equipment (UE) for use in a communications network, the UE comprising:
- a cell reselection module for detecting cell re-selection events; and
- a logging module for storing a logged minimization of drive test (MDT) record when selected cell re-selection events are detected by the cell re-selection module, the logging module further configured to:
  - store a first Logged MDT record at the UE when the cell re-selection module detects a first cell re-selection event; and
  - store a second Logged MDT record at the UE when the cell re-selection module detects a second cell re-selection event, wherein the first Logged MDT record and the second Logged MDT record are used to identify cell boundaries in the communications network.

20. The UE of claim 19, wherein the first cell re-selection event is the UE moving from an third generation partnership project (3GPP) long term evolution (LTE) cell to a universal mobile telecommunications system (UMTS) cell and the second cell re-selection event is the UE moving from the UMTS cell to an other LTE cell.

21. The UE of claim 19, wherein the first cell re-selection event is the UE moving from an LTE cell to a coverage hole and the second cell re-selection event is the UE moving from the coverage hole to an other LTE cell.

22. The UE of claim 21, further configured to collect the MDT measurements for a coverage and capacity optimization (CCO) self-organizing network (SON) function to identify the LTE coverage hole in the cellular network.

23. The UE of claim 21, wherein the coverage hole is an area where a pilot signal strength is below a selected threshold value for the UE to access the cellular network.

24. The UE of claim 19, further comprising:
- a receiver module for receiving a UE information request from an evolved Node B (eNode B) requesting the Logged MDT record; and
- a transmitting module for sending a UE information response that includes the Logged MDT record to the eNode B.

* * * * *